Jan. 8, 1957   H. W. KING   2,776,679
OVERHEAD BELT WORK FEEDING DEVICE FOR A SAW
Filed Sept. 3, 1954   5 Sheets-Sheet 4
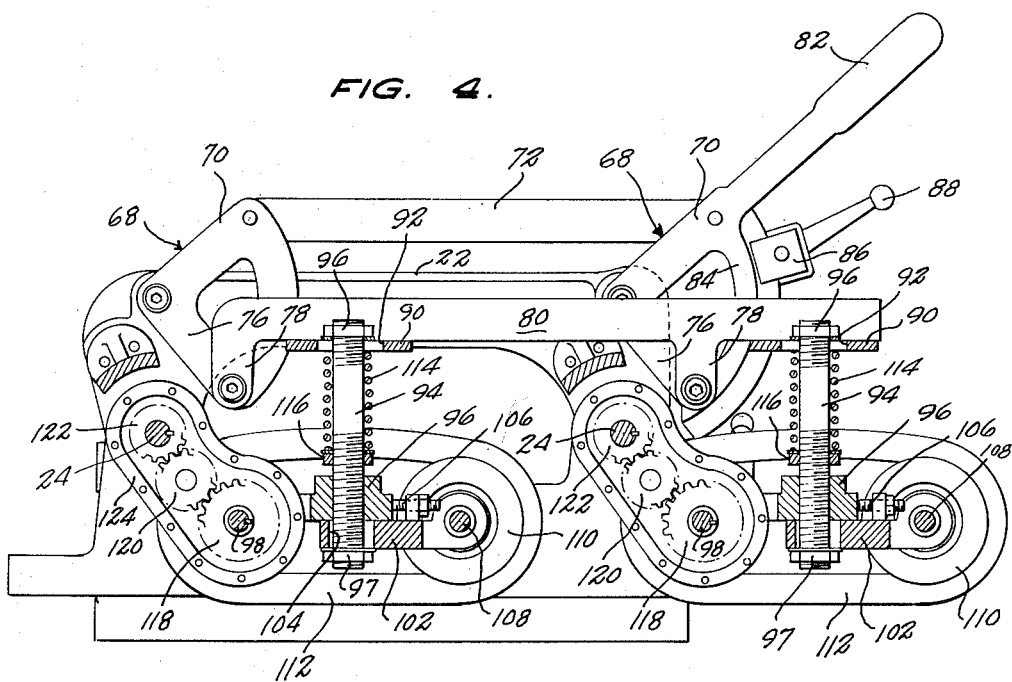
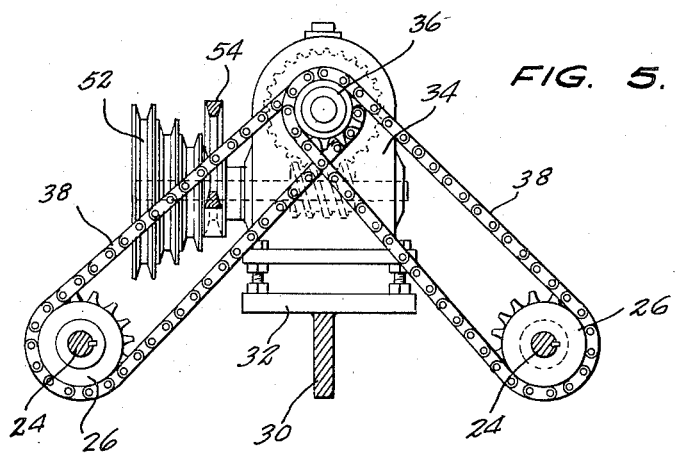
INVENTOR.
HUGH W. KING,
BY
McMorrow, Berman + Davidson
ATTORNEYS.

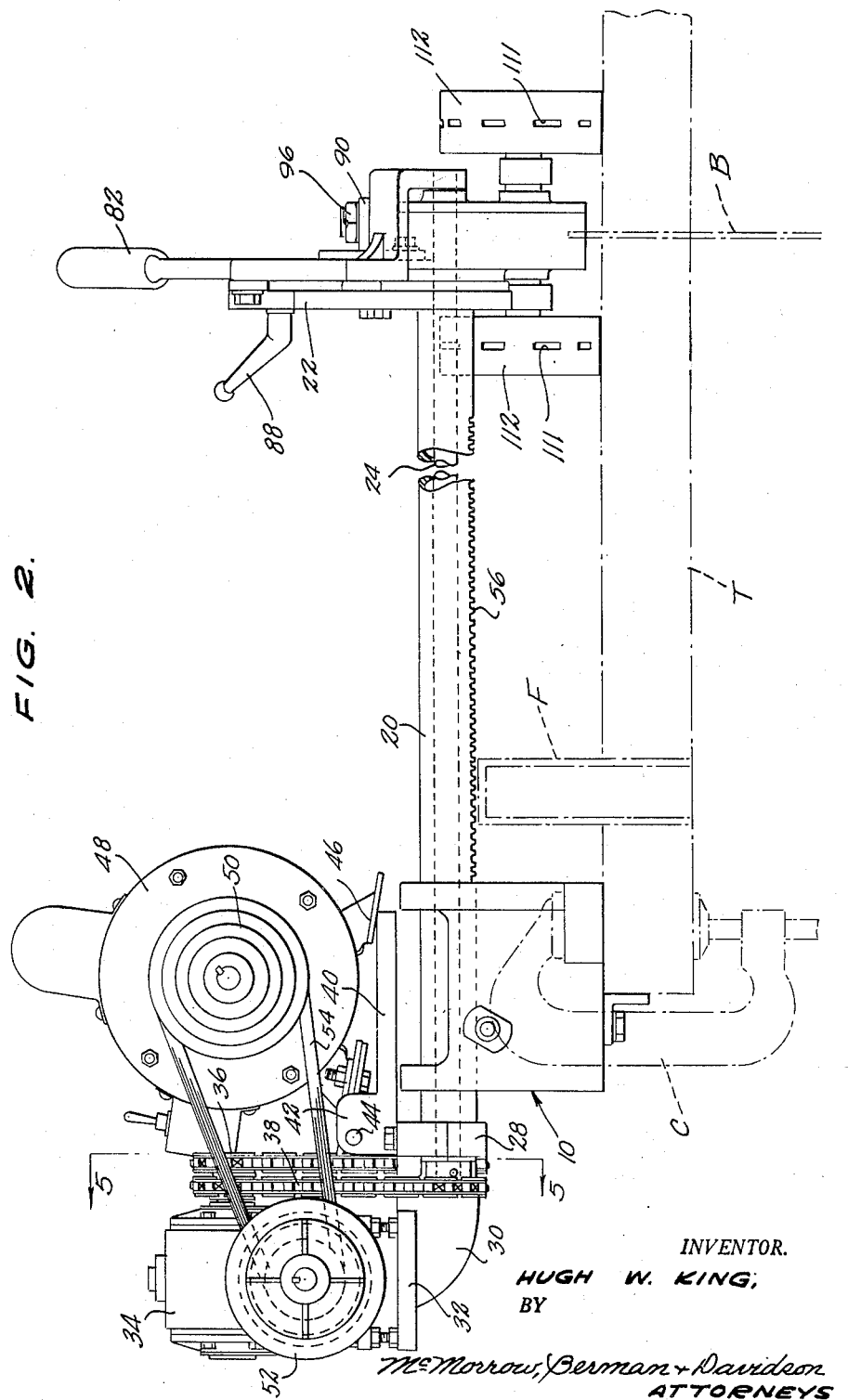

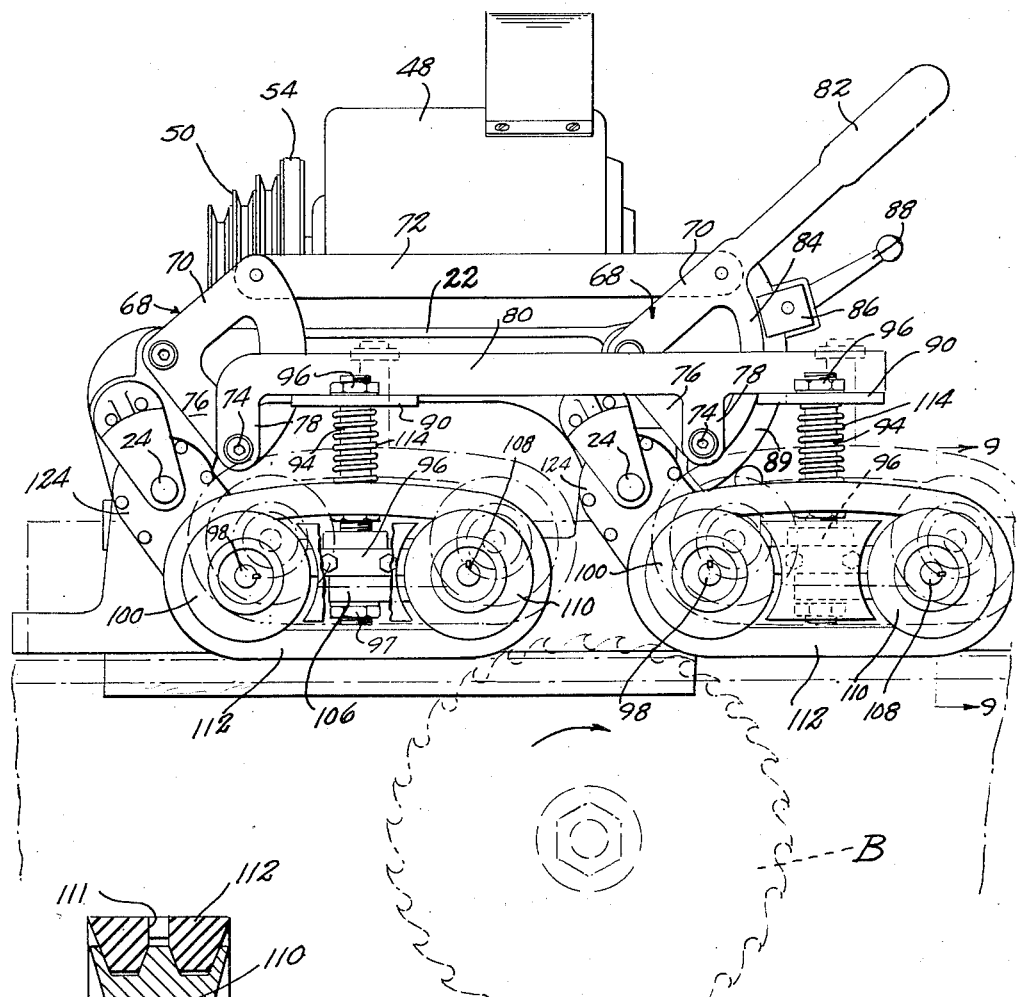

Jan. 8, 1957 H. W. KING 2,776,679
OVERHEAD BELT WORK FEEDING DEVICE FOR A SAW
Filed Sept. 3, 1954 5 Sheets-Sheet 5
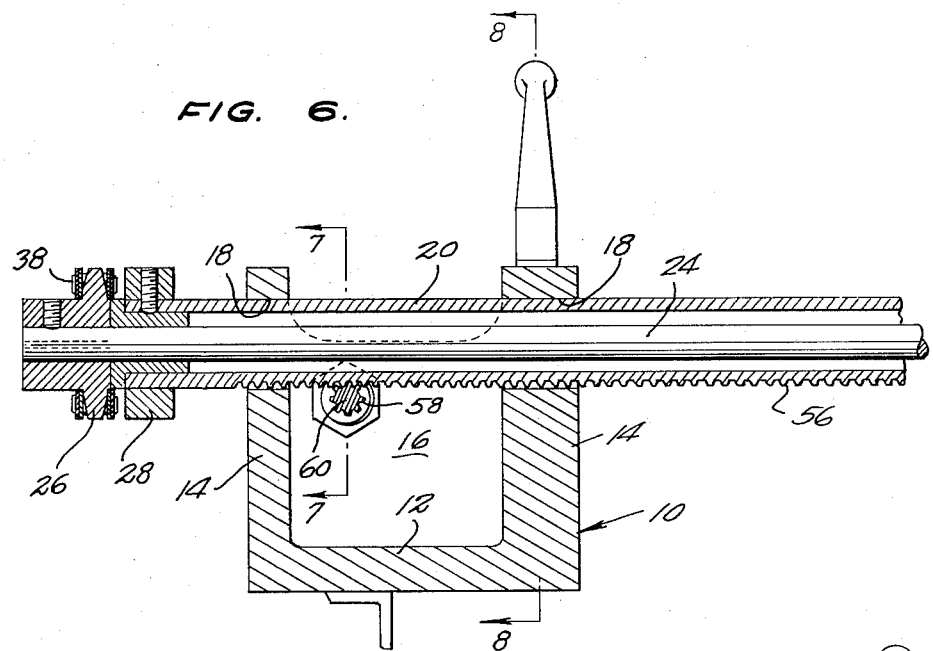
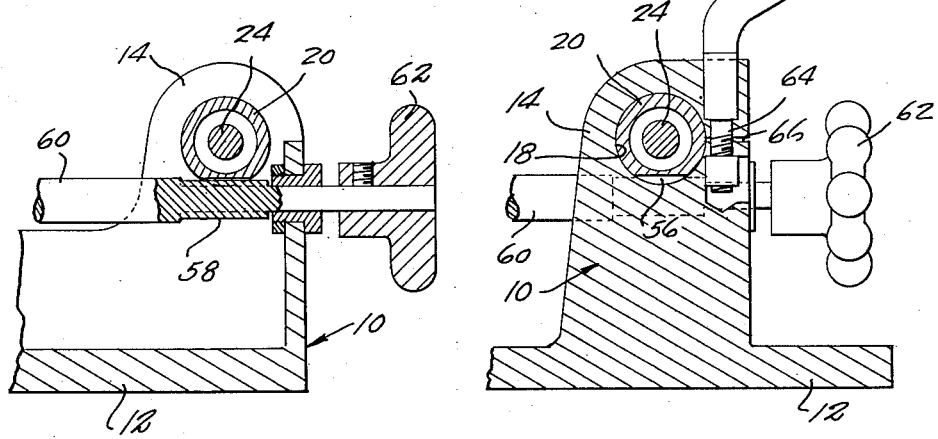
INVENTOR.
HUGH W. KING,
BY
ATTORNEYS.

United States Patent Office 2,776,679
Patented Jan. 8, 1957

2,776,679

OVERHEAD BELT WORK FEEDING DEVICE FOR A SAW

Hugh W. King, Corinth, Miss.

Application September 3, 1954, Serial No. 454,184

5 Claims. (Cl. 143—49)

This invention relates to a work feeding device for a saw and has for its primary object to automatically feed work at a selected speed across a saw table and into engagement with a saw blade extending therethrough.

Another object is to engage the work on opposite sides of a saw blade to retain the work against the table and avoid vibration and chattering.

A further object is to hold the traction belts of the feeding device against the work under yielding pressure and to enable the traction belts to be elevated above the table for accommodating work of different thicknesses and to facilitate the advance of the work into the feeder.

The above and other objects may be attained by employing this invention which embodies among its features carriages mounted above a saw table to move upwardly and downwardly there above adjacent a saw blade extending through the table, traction belts carried by the carriages for engagement with work mounted on the table, and means carried by the table and operatively connected to the traction belts for moving said traction belts and advancing work engaged thereby into the saw blade.

Other features include means carried by the table and operatively connected to the carriages for elevating them and facilitating the deposit of work on the table, and means carried by the table and operatively connected to the carriage elevating means for locking it in a selected position and holding the carriages and traction belts carried thereby at a selected height above the table.

Still other features include a pedestal carried by the table and extending upwardly therefrom in spaced relation to a saw blade extending through the table, arms carried by the pedestal and extending across the top of the table in spaced relation thereto, carriages carried by the arms for movement in vertical arcuate paths adjacent the saw blade, traction belts carried by the carriages for movement in closed paths, on opposite sides of the saw, and means carried by the pedestal and operatively connected to the traction belts for moving said belts in unison in their closed paths and advancing work extending beneath the carriages and engaging the traction belts along the saw table and into the saw blade.

Still other features include a lift carried by the arms and extending therebetween above and operatively connected to the carriages for elevating the carriages and moving the traction belts out of engagement with the table, a handle carried by the arms and operatively connected to the lift for elevating it and a clamp carried by the arms adjacent the lift means for clampingly engaging said lift means and holding the traction belts at a selected height above the table.

Other features include spaced parallel tubular arms carried by the pedestal and extending across the top of the table in spaced relation thereto, a support carried by the arms and extending therebetween adjacent the ends thereof remote from the pedestal, a lift mounted on the support to move upwardly and downwardly above the table, ears carried by the lift and extending laterally outwardly therefrom adjacent opposite ends thereof, carriages carried by the ears and extending downwardly therefrom, traction belts carried by the carriages for movement in closed paths in tandem on opposite sides of the saw blade, drive shafts extending through the tubular arms and operatively connected to the traction belts for moving them in their closed paths and advancing work engaged by the belts into the saw blade, and means carried by the pedestal and operatively connected to the drive shafts for rotating them.

Still further features include means carried by the pedestal and operatively connected to the carriages for moving them transversely of the saw blade.

In the drawings:

Figure 2 is an end view in elevation of the feeder illustrated in Figure 1;

Figure 3 is a side view of the feeder on a slightly enlarged scale;

Figure 4 is a sectional view taken substantially on the line 4—4 of Figure 1;

Figure 5 is a sectional view taken substantially on the line 5—5 of Figure 2;

Figure 6 is an enlarged fragmentary sectional view taken substantially on the line 6—6 of Figure 1;

Figure 7 is a fragmentary sectional view taken substantially on the line 7—7 of Figure 6;

Figure 8 is a fragmentary sectional view taken substantially on the line 8—8 of Figure 6; and Figure 9 (Sheet 3) is an enlarged fragmentary sectional view taken substantially on the line 9—9 of Figure 3.

Figure 1:
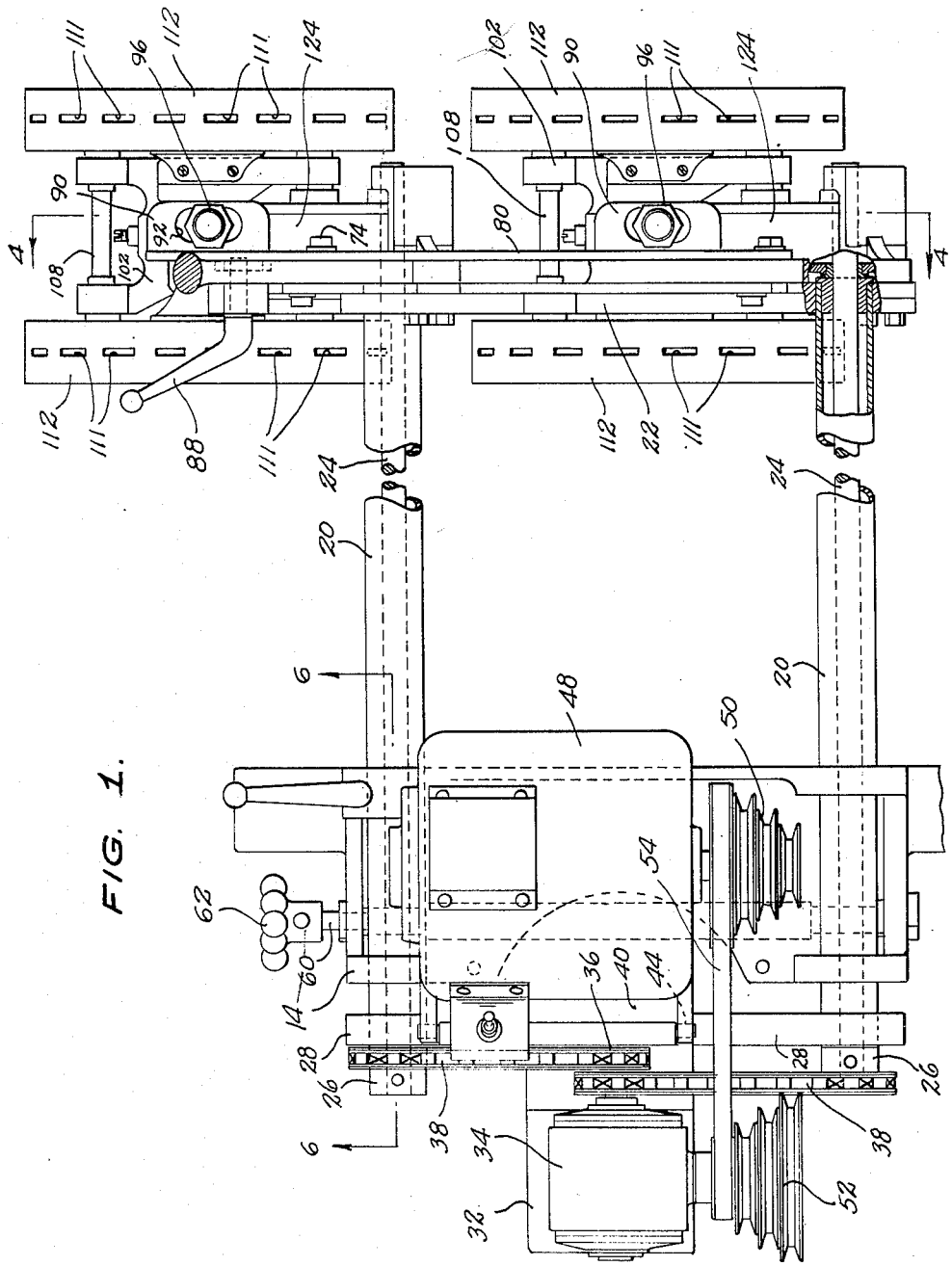
Figure 1 is a top plan view of a work feeder embodying the features of this invention.

Referring to the drawings in detail, a saw table T (Fig. 2) is provided with an opening through which extends a saw blade B of conventional form, and carried by the table T in spaced relation to the saw blade B is a conventional fence F. The structure so far recited is conventional and forms no part of this invention except in combination therewith. Clamped to one side of the table T remote from the saw blade B as by a C-clamp C is a pedestal designated generally 10 comprising a head 12 carrying upwardly extending spaced pairs of legs 14 (Fig. 6) and webs 16 which join the legs 14 and extend therebetween adjacent opposite ends of the pedestal 10. Extending through each pair of legs 14 are aligning openings 18 in which are mounted for longitudinal movement tubular arms 20 which extend across the top of the table T in spaced relation thereto. Carried by the ends of the tubular arms 20 remote from the pedestal 10 is a support 22 (Fig. 2) which extends between the arms in parallel relation to the saw blade B.

Mounted for rotation within the tubular arms 20 are spaced parallel drive shafts 24 which extend through the arms and carried by the drive shafts adjacent the ends thereof for rotation therewith are drive sprockets 26 by means of which the shafts 24 are driven. Carried by the arms adjacent the sprockets 26 for movement longitudinally therewith and extending therebetween is a bar 28 carrying an outwardly extending bracket 30 to the upper surface of which is connected a supporting plate 32 on which a conventional speed reduction gearing 34 is mounted. A double sprocket 36 is carried by the output shaft of the speed reduction gear train 34 and is connected through the medium of endless chains 38 (Fig. 5) with the sprockets 26 so that when the double sprocket 36 is rotated, the drive shafts 24 will be rotated. Carried by the supporting bar 28 and extending laterally therefrom between the arms 20 is a bed plate 40 (Figs. 1 and 2) carrying adjacent opposite side edges upstanding ears 42 in which are mounted a pivot pin 44 carrying a motor base 46 on which is mounted for rocking movement a drive motor 48. The drive shaft of the drive motor 48 is provided with a cone pulley 50 and a similar but reversed cone pulley 52 is carried by the power input shaft of the speed reducing gear train 34. An endless belt 54 establishes driving connection between the cone pulleys 50 and 52 in a conventional manner. It will thus be seen that when the prime mover or motor 48 is energized the drive shafts 24 will be rotated within their respective arms 20.

In the preferred form of the invention, the undersides of the arms 20 are toothed as at 56, and meshing with the toothed sides of the arms 20 are spaced gears 58 (Figs. 6 to 8) carried adjacent opposite ends of an adjusting shaft 60 which is mounted in the webs 16 to rotate about an axis which lies perpendicular to the longitudinal axes of the arms 20. A suitable hand wheel 62 is carried by the shaft 60 and projects outwardly from the side of the pedestal 10 remote from the drive belt 54. It will thus be seen that by turning the hand wheel 62 the arms 20 may be moved longitudinally through the openings 18 in the pedestal 10 to move the support 22 relative to the saw blade B. A suitable clamp screw 64 is carried by one of the arms 14 which is split as to 66 to provide a pair of spaced jaws which may be drawn together by the clamp screw 64 to clampingly engage the arm 20 which extends through the opening 18 in said pedestal and lock the arms against movement longitudinally through their respective openings 18.

Pivotally mounted on the support 22 for rocking movement about longitudinally spaced axes which lie parallel with and above the axis of the drive shafts 24 are bell crank levers 68 (Figs. 3 and 4), the upper arms 70 of which are connected together by a link 72 so that when one of the bell crank levers 68 is moved about its pivotal connection with the support 22 the other bell crank lever will move in unison therewith. Pivotally connected as at 74 to the lower arms 76 of each bell crank lever 68 is a depending leg 78 of a lift bar 80 which extends parallel to the support bar 22 and the link 72 as will be readily understood upon reference to Figures 3 and 4. A handle 82 is carried by one of the bell crank levers 68 and extends longitudinally outwardly therefrom in alignment with the arm 70 thereof for moving the link 72 and bell crank levers 68 and raising or lowering the lift bar 80. Carried by the support bar 22 for movement toward and away from the quadrant 84 carried by the adjacent bell crank lever 68 is a brake shoe 86 which is adapted to be moved into and out of frictional engagement with the quadrant 84 to hold the lift bar 80 at a selected height above the saw table T. A handle 88 is carried by an arm 89 which is fixed to the support 22 and said handle 88 is operatively connected to the brake shoe 86 to advance it into frictional contact with the adjacent quadrant 84 to hold the bell crank levers and the lift bar 80 in a selected position. Carried by the lift bar 80 and extending laterally outwardly therefrom adjacent opposite ends thereof are ears 90 having elongated longitudinal slots 92 (Fig. 1) extending vertically therethrough for the reception of the carriage supporting studs to be more fully hereinafter described.

Extending through the slots 92 in the ears 90 are depending studs 94 and carrying at their upper ends stop nuts 96 which engage the upper sides of the ears 90 and limit downward movement of the studs 94.

The studs 94 are provided adjacent their lower ends with external screw threads 95 (Fig. 4) and threadedly engaged with the screw threads 95 are stop nuts 116. Compression coiled springs 114 encircle the studs between the ears 90 and stop nuts 116 and bear on the ears and stop nuts to yieldingly urge the lower ends of the studs downwardly.

Threadedly engaged with the threads on each stud 94 is a shoe 96 which extends laterally outwardly from its respective stud and carries adjacent its end remote from the stud a horizontally extending drive shaft 98 and fixed to said shaft 98 for rotation therewith adjacent opposite ends thereof are double grooved pulleys 100 (Fig. 3). A drive gear 118 (Fig. 4) is mounted on each shaft 98 intermediate the ends thereof for rotation therewith and has meshing engagement with an idler gear 120 which in turn meshes with a drive gear 122 carried by a drive shaft 24. The gears 118, 120 and 122 are enclosed by housings 124 which move in arcuate paths about the axes of the shafts 24 to raise or lower the grooved pulleys 100 previously mentioned.

Clamped against the undersides of the shoes 96 by clamp nuts 97 are arms 102 which extend laterally outwardly from the studs 94 in alignment with but below the level of the shoes 96, and carried by the arms 102 remote from the studs 94 are axle shafts 108 upon which are mounted adjacent opposite ends thereof for rotation about axes parallel with the drive shafts 98 double grooved idler pulleys 110. Endless double V-belts 112 are trained over each pair of pulleys 100 and 110 on opposite sides of the studs 94 to define traction belts by which the work is fed across the table T and into the saw S. In order to enable the tension of the traction belts 112 to be varied, the arms 102 are provided with elongated longitudinal slots 104 which enable the arms to be shifted by the screws 106 which threadedly engage upstanding ears carried by the arms and impinge on the adjacent ends of the shoes 96. In the preferred form of the invention the double V-belts 112 are provided with longitudinally spaced elongated longitudinally extending slots 111 (Figs. 1 and 2) which provide pockets into which sawdust may be received to improve the tractive effort of the traction belts on the work. The shoes 96 and arms 102 define carriages adjacent the lower ends of the studs 94 upon which the traction belts 112 are mounted to operate in closed paths adjacent and on opposite sides of the saw blade B.

In use with the saw feeding attachment connected to a saw table T substantially as illustrated in Figure 2 by a C-clamp C, the supporting arms 20 may be moved to a selected position relative to the saw blade B by means of the hand wheel 62. By operating the clamp, the jaw member of the leg 14 having the slot 66 therein may be clamped into frictional engagement with the arm 20 extending through the leg 14 to hold the support 22 in a selected position relative to the saw blade B. By manipulating the handle 82 it is evident that the lift bar 80 may be moved to hold the carriages in selected positions relative to the table T and by advancing the shoe 86 into contact with the quadrant 84 the lift bar may be held at a selected height. By setting the prime mover 48 into operation it will be evident that driving effort will be transmitted through the cone pulleys 50 and 52 through the medium of the belt 54 and thence through the speed reduction gear train 34 to the dual drive sprocket 36, and thence through the endless chains 38 to the sprockets 26 carried by the drive shafts 24. With the drive shafts 24 in operation it will be evident that the traction belts 112 will be driven through the gear trains within the housings 124 so that work deposited on the table and advanced into contact with the traction belts 112 will be moved by the traction belts 112 across the table and into contact with the saw blade B. Owing to the fact that the traction belts engage the work on opposite sides of the saw blode B, it will be evident that vibration of the work on the table and the resultant chattering will be eliminated. Obviously by adjusting the screws 106 the tension of the traction belts may be regulated.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a power driven saw of the type having a saw table, and a saw blade extending through the table for engaging work mounted on the table, means for advancing work across the table and into engagement with the saw blade comprising, spaced parallel arms carried by the table and extending across the top thereof in upwardly spaced relation thereto, a support carried by the arms and extending therebetween adjacent the saw blade, carriages carried by the support on opposite sides of the saw blade for up and down movement above the table, traction belts carried by the carriages for movement in closed paths on opposite sides of the saw, means carried by the table and operatively connected to the traction belts for moving said belts in their closed paths and advancing work engaged by said traction belts into the saw, and means carried by the support and operatively engaging the carriages for advancing said carriages toward the table under yielding pressure.

2. In a power driven saw of the type having a saw table, and a saw blade extending through the table for engaging work mounted on the table, means for advancing work across the table and into engagement with the saw blade comprising, a pedestal carried by the table and extending upwardly therefrom in spaced relation to the saw blade, spaced parallel arms carried by the pedestal and extending across the top of the table in spaced relation thereto, a support carried by the arms and extending therebetween adjacent the ends thereof adjacent the saw blade, a lift carried by the support and extending adjacent the side thereof remote from the arms, carriages carried by the lift for movement therewith above the table, traction belts carried by the carriages for movement in closed paths on opposite sides of the saw blade, means carried by the pedestal and operatively connected to the traction belts for moving said belts in their closed paths and advancing work engaged by said traction belts into the saw, and means carried by the supports and operatively connected to the lift for moving the traction belts toward or away from the table.

3. In a power driven saw of the type having a saw table, and a saw blade extending through the table for engaging work mounted on the table, means for advancing work across the table and into engagement with the saw blade comprising, a pedestal carried by the table and extending upwardly therefrom in spaced relation to the saw blade, spaced parallel arms carried by the pedestal and extending across the top of the table in spaced relation thereto, a support carried by the arms and extending therebetween adjacent the ends thereof adjacent the saw blade, a lift carried by the support and extending across the side thereof remote from the arms, carriages carried by the lift for movement therewith above the table, traction belts carried by the carriages for movement in closed paths on opposite sides of the saw blade, means carried by the pedestal and operatively connected to the traction belts for moving said belts in their closed paths and advancing work engaged by said traction belts into the saw, a handle carried by the support and operatively connected to the lift for moving the traction belts toward and away from the table, and a clamp carried by the support adjacent the lift for advance into contact therewith to clampingly engage it and hold the traction belts at a selected height above the table.

4. In a power driven saw of the type having a saw table, and a saw blade extending through the table for engaging work mounted on the table, means for advancing work across the table and into engagement with the saw blade comprising a pedestal clamped to the table and extending upwardly therefrom in spaced relation to the saw blade, spaced parallel tubular arms carried by the pedestal for movement across the top of the table in spaced relation thereto, means carried by the pedestal and engaging the arms for moving them across the table, a support carried by the arms and extending therebetween adjacent the ends thereof remote from the pedestal, a lift mounted on the support to move upwardly and downwardly above the table, ears carried by the lift and extending laterally outwardly therefrom adjacent opposite ends thereof, carriages carried by the ears and extending downwardly therefrom, traction belts carried by the carriages for movement in closed paths in tandem on opposite sides of the saw blade, drive shafts extending through the tubular arms and operatively connected to the traction belts for moving them in their closed paths and advancing work engaged by the belts into the saw blade, means carried by the pedestal and operatively connected to the drive shafts for simultaneous rotation thereof, and means carried by the carriages and operatively connected to the lift for advancing the traction belt toward the table under yielding pressure.

5. In a power driven saw of the type having a saw table, and a saw blade extending through the table for engaging work mounted on the table, means for advancing work across the table and into engagement with the saw blade comprising a pedestal carried by the table and extending upwardly therefrom in spaced relation to the saw blade, spaced parallel tubular arms carried by the pedestal and extending across the top of the table in spaced relation thereto, a support carried by the arms and extending therebetween adjacent the ends thereof remote from the pedestal, a lift mounted on the support to move upwardly and downwardly above the table, ears carried by the lift and extending laterally outwardly therefrom adjacent opposite ends thereof, carriages carried by the ears and extending downwardly therefrom, traction belts carried by the carriages for movement in closed paths in tandem on opposite sides of the saw blade, drive shafts extending through the tubular arms and operatively connected to the traction belts for moving them in their closed paths and advancing work engaged by the belts into the saw blade, means carried by the pedestal and operatively connected to the drive shafts for rotating them, and springs carried by the carriages and engaging the ears for yieldingly urging the carriages downwardly and the traction belts into frictional contact with work resting on the table.

References Cited in the file of this patent

UNITED STATES PATENTS

| | | |
|---|---|---|
| 877,124 | Robinson et al. | Jan. 21, 1908 |
| 1,109,747 | Giertsen | Sept. 8, 1914 |
| 1,561,479 | Oettel | Nov. 17, 1925 |
| 1,748,906 | Tardif et al. | Feb. 25, 1930 |
| 2,593,745 | Gillespie | Apr. 22, 1952 |
| 2,615,483 | King | Oct. 28, 1952 |
| 2,646,088 | Smith | July 21, 1953 |
| 2,664,123 | Arvidson | Dec. 29, 1953 |